(No Model.)
J. W. REEDER.
BOILER TUBE.
No. 324,594. Patented Aug. 18, 1885.
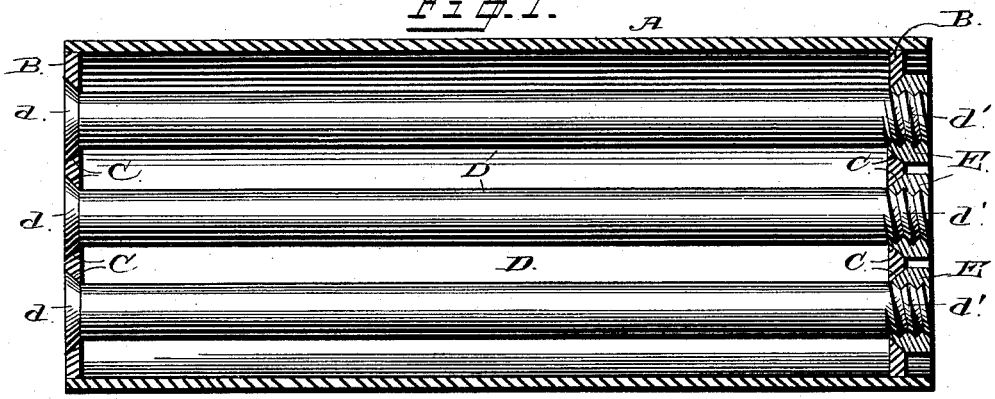
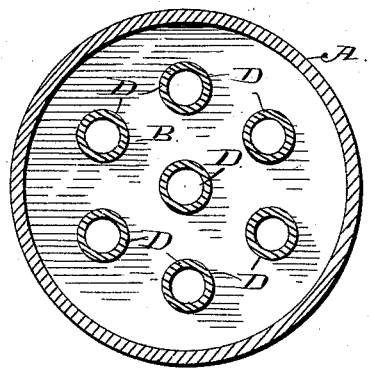
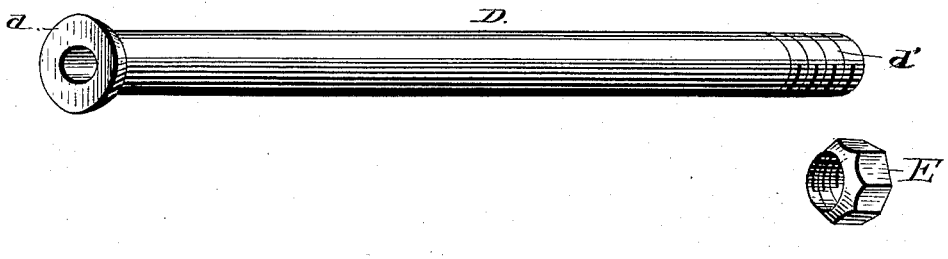
WITNESSES
M. E. Fowler.
E. G. Siggers.
J. W. Reeder.
INVENTOR
by C. A. Snow & Co.
Attorneys

UNITED STATES PATENT OFFICE.

JAMES WILLIAM REEDER, OF SHELBYVILLE, ILLINOIS.

BOILER-TUBE.

SPECIFICATION forming part of Letters Patent No. 324,594, dated August 18, 1885.

Application filed January 30, 1885. (No model.)

*To all whom it may concern:*

Be it known that I, JAMES W. REEDER, a citizen of the United States, residing at Shelbyville, in the county of Shelby and State of Illinois, have invented a new and useful Improvement in Boiler-Tubes, of which the following is a specification, reference being had to the accompanying drawings.

My invention relates to an improvement in boiler-tubes; and it consists in a tube that is provided with a beveled collar at one end, and which is screw-threaded at the opposite end to receive a beveled nut, in combination with a boiler having countersunk openings in its heads to receive the beveled collar and nut, as will be more fully set forth hereinafter.

The object of my invention is to provide a tube for steam boilers that can be readily removed therefrom and cleaned or replaced without the help of a skilled mechanic, and that is so constructed as to insure a perfectly steam-tight joint with the boiler.

In the accompanying drawings, Figure 1 is a vertical longitudinal sectional view of a boiler with my improved tubes applied thereto. Fig. 2 is a transverse sectional view of the same. Fig. 3 is a detailed perspective of one of my tubes and the nut therefor.

A represents a boiler having the heads B, which are provided with countersunk openings C. D represents the tubes, which are provided at one end with the beveled collars $d$, which are adapted to fit in the countersunk openings of one of the boiler-heads, and at the opposite end with the screw-threads $d'$, which are adapted to enter the nuts E, that are beveled on their inner sides to fit the countersunk openings in the boiler-head. By turning the nuts the tubes may be tightened in their bearings in the boiler-heads to any desired degree, and the beveled collars and nuts, in connection with the countersunk openings in the boiler-heads, form ground joints which are perfectly secure and steam-tight.

In boilers in which the tubes are of the ordinary construction it requires a great deal of skill, time, and labor to remove the tubes for the purpose of cleaning or replacing them, and involves the expense of employing a skilled mechanic.

Boiler-tubes constructed as hereinbefore described are cheap, can be readily taken out from the boiler by any person of ordinary intelligence, and cleaned or replaced in a very short time, and thereby a great saving of time and money can be effected.

I am aware that it is not new to provide a boiler with tubes which have their ends threaded, and collars to screw over the threaded ends of tubes, said collars fitting into enlarged openings of the boiler-head. In my improvement the openings in the boiler-head are just large enough to allow the passage of the tubes, and the nuts are formed with beveled inner ends to fit in the countersunk portion of the openings, said nuts having angular heads, so as to be turned by a wrench in forming a ground joint. Furthermore, one of the heads of the boiler is flanged, so as to come on a line with and inclose the nuts and protect the latter from accidental detachment.

Having thus described my invention, I claim—

A boiler having its heads provided with countersunk openings C, in combination with the tubes D, having beveled collars $d$ at one end, which fit flush in the openings C of one of the boiler-heads, the other end of the tubes passing through the openings C of the other boiler-head, and extended a short distance beyond the same, and threaded, as shown at $d'$, said threaded extensions fitting the openings C closely, and nuts working over the threaded ends or extensions of the tubes, and having beveled inner ends adapted to fit within the countersunk portion of the openings C, the head of the boiler around the nuts being flanged, so as to inclose the latter, for the purpose set forth.

In testimony that I claim the foregoing as my own I have hereto affixed my signature in presence of two witnesses.

JAMES WILLIAM REEDER.

Witnesses:
H. S. DIXON,
E. W. LLOYD.